United States Patent
Ono et al.

(10) Patent No.: US 12,199,810 B2
(45) Date of Patent: Jan. 14, 2025

(54) NETWORK DEVICE, CONTROL METHOD, AND STORAGE MEDIUM

(71) Applicant: BUFFALO INC., Nagoya (JP)

(72) Inventors: Takahiro Ono, Aichi (JP); Goki Ichikawa, Aichi (JP); Hajime Kinoshita, Aichi (JP)

(73) Assignee: BUFFALO INC., Nagoya (JP)

( * ) Notice: Subject to any disclaimer, the term of this patent is extended or adjusted under 35 U.S.C. 154(b) by 0 days.

(21) Appl. No.: 18/236,951

(22) Filed: Aug. 23, 2023

(65) Prior Publication Data
US 2024/0073083 A1    Feb. 29, 2024

(30) Foreign Application Priority Data

Aug. 26, 2022    (JP) .................... 2022-134660

(51) Int. Cl.
*H04L 41/0604*    (2022.01)
*H04L 43/0811*    (2022.01)

(52) U.S. Cl.
CPC ...... *H04L 41/0613* (2013.01); *H04L 43/0811* (2013.01)

(58) Field of Classification Search
None
See application file for complete search history.

(56) References Cited

U.S. PATENT DOCUMENTS

2017/0006160 A1*  1/2017  Marya ................... H04W 4/14
2019/0109834 A1*  4/2019  Lyons ................... H04L 9/3297

OTHER PUBLICATIONS

"Keep this in mind! Broadband terminology points Wireless LAN routers vol. 25: Internet line automatic detection function", Broadband Watch, Available Online At: https://bb.watch.impress.co.jp/cda/koko_osa/20038.html, Retrieved from the net on: Aug. 23, 2020, 5 pages pages including English Translation.

* cited by examiner

*Primary Examiner* — Mohamed Ibrahim
(74) *Attorney, Agent, or Firm* — XSENSUS LLP (57) ABSTRACT

A network device that is connectable to a network includes processing circuitry. The processing circuitry is configured to execute detection processing including detection of connection availability for a plurality of different types of connections to the network, and generate a detection code indicating a detection result of the plurality of different types of connections to the network in responding to the detection processing.

17 Claims, 8 Drawing Sheets

| | |
|---|---|
| 1 | VERSION |
| 3 | ACTIVATION TRIGGER |
| 3 | R/B DETECTION |
| 1 | LINK DETECTION |
| 0 | |
| 2 | DHCP/IGD |
| 0 | |
| 1 | PPPoE |
| 0 | |
| 1 | IPv6 FOR 4o6 |
| 0 | |
| 2 | FIRST METHOD |
| 1 | |
| 2 | SECOND METHOD |
| 0 | |
| 1 | |
| 1 | THIRD METHOD |
| 0 | |
| 0 | |
| 3 | LINE DETECTION RESULT |
| 1 | CONNECTION CONFIRMATION |
| 2 | GUA/Prefix/DNS |
| 0 | |
| 2 | LINE DETECTION RESULT |
| 1 | CONNECTION CONFIRMATION |
| 9 | |
| 0 | |
| 9 | UPSTREAM DEVICE DETECTION RESULT |
| 6 | |
| F | |
| 3 | |
| 0 | PARITY |

NETWORK DEVICE, CONTROL METHOD, AND STORAGE MEDIUM

CROSS-REFERENCE TO RELATED APPLICATION

This application is based on and claims priority under 35 USC 119 from Japanese Patent Application No. 2022-134660 filed on Aug. 26, 2022, the entire content of which is incorporated herein by reference.

TECHNICAL FIELD

The present disclosure relates to a network device, a control method, and a storage medium.

BACKGROUND

A router having a function of searching for a line type on the Internet side and automatically executing settings until connection to the Internet is completed has been known (see, for example, "Keep this in mind! Broadband terminology points Wireless LAN routers Vol. 25: Internet line automatic detection function", Broadband Watch, [online], [searched on Aug. 23, 2020], Internet <URL: https://bb.watch.impress.co.jp/cda/koko_osa/20038.html>).

SUMMARY

According to an aspect of the present disclosure, there is provided a network device that is connectable to a network, the network device including: processing circuitry configured to execute detection processing including detection of connection availability for a plurality of different types of connections to the network, and generate a detection code indicating a detection result of the plurality of different types of connections to the network in responding to the detection processing.

According to another aspect of the present disclosure, there is provided a control method for a network device connectable to a network, including: executing, by processing circuitry of the network device, detection processing including detection of connection availability for a plurality of different types of connections to the network; and generating, by the processing circuitry of the network device, a detection code indicating a detection result for the plurality of different types of connections to the network in responding to the detection processing.

According to another aspect of the present disclosure, there is provided a non-transitory computer-readable storage medium storing a control program to cause a processor of a network device connectable to a network to execute a process, the process including: executing detection processing including detection of connection availability for a plurality of different types of connections to the network; and generating a detection code indicating a detection result for the plurality of different types of connections to the network in responding to the detection processing.

BRIEF DESCRIPTION OF DRAWINGS

Exemplary embodiment(s) of the present disclosure will be described in detail based on the following figures, wherein.

DETAILED DESCRIPTION

Sometimes, even a router with a function of searching for a line type on the Internet side and automatically executing settings until connection to the Internet is completed may fail to connect to the Internet. In this case, it is difficult for a user of the router to describe a reason for failure to an inquiry destination such as a manufacturer. If the inquiry destination cannot obtain the reason for the failure, a state and an installation environment of the router cannot be reproduced, and information (logs) regarding the state and the installation environment of the router at the time of the communication failure are not obtained, and thus it is difficult to perform an investigation for improvement or the like.

The present disclosure is made in view of the above circumstances, and an object of the present disclosure is to efficiently provide information on a communication failure.

Hereinafter, embodiments of the present disclosure will be described with reference to the drawings.

(Wireless Communication System to which Network Device of the Present Disclosure is Applied)

Figure 1:
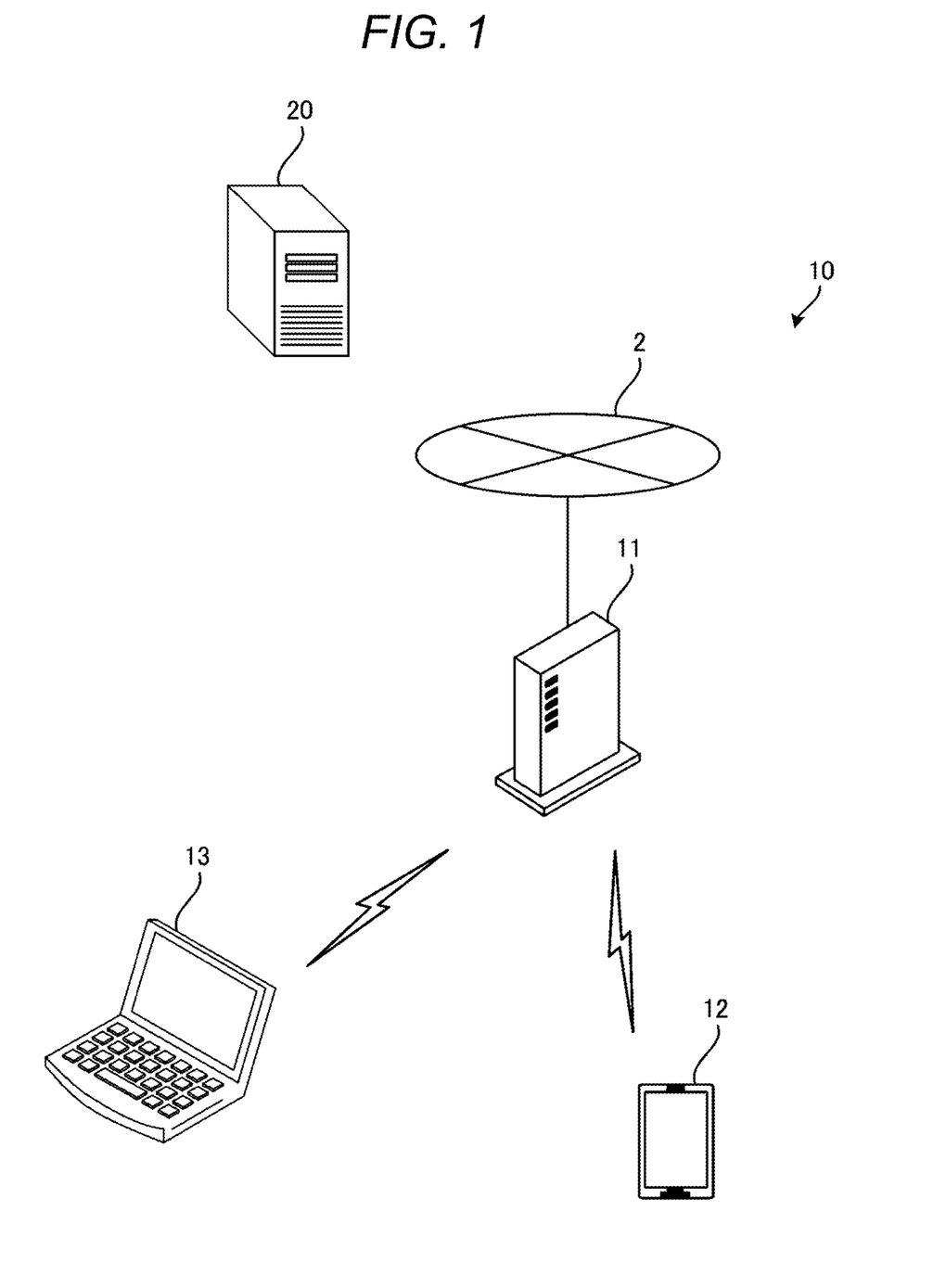
FIG. 1 is a diagram showing an example of a wireless communication system to which a network device of the present disclosure is applied.

FIG. 1 is a diagram showing an example of a wireless communication system to which a network device of the present disclosure is applied. A wireless communication system 10 shown in FIG. 1 includes, for example, a router 11 and user terminals 12 and 13.

The router 11 is an example of the network device of the present disclosure. The router 11 has a router function of relaying communication between a network 2 and a communication device (for example, the user terminals 12 and 13) connected to the router 11. The network 2 is, for example, a wide area network (WAN) such as the Internet, and is connectable after connection methods are detected. Here, the connection methods correspond to the different types of connections to the network.

The router 11 is a so-called wireless local area network (LAN) router that functions as a wireless LAN access point that forms a wireless LAN. The router 11 may further have a function such as a switching hub.

The user terminals 12 and 13 are communication devices having a function of performing wireless communication with the router 11 by connecting to the wireless LAN formed by the router 11. In the example shown in FIG. 1, the user terminal 12 is a smartphone, and the user terminal 13 is a notebook personal computer.

A server 20 is connected to the network 2. The server 20 is, for example, a server that collects a log of a router (for example, the router 11) connected to the network 2, and is, for example, a server managed by a manufacturer of the router 11.

(Hardware Configuration Example of Router 11)

Figure 2:
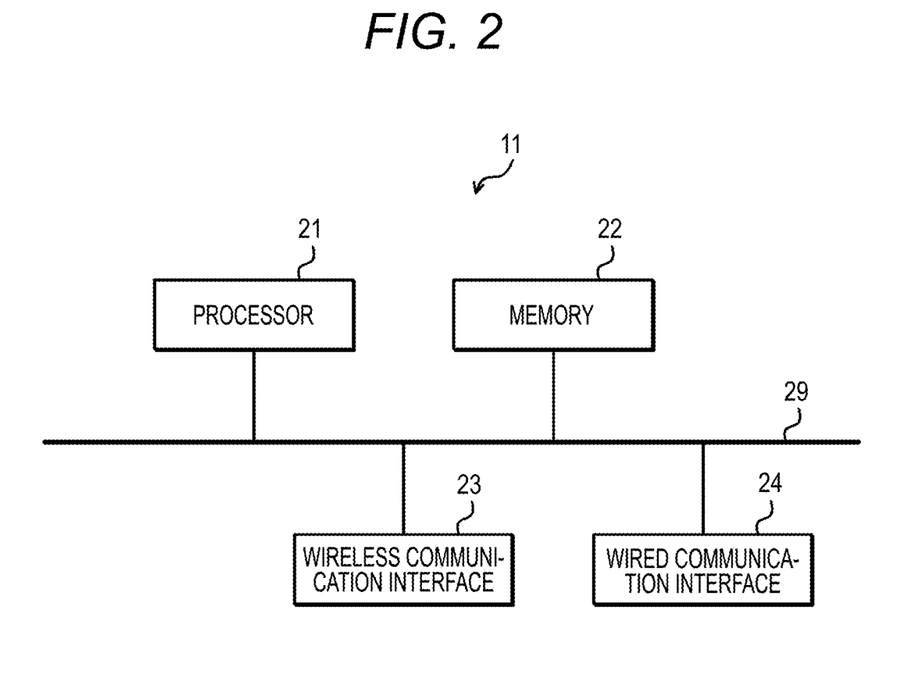
FIG. 2 is a diagram showing an example of a hardware configuration of a router.

FIG. 2 is a diagram showing an example of a hardware configuration of the router 11. The router 11 shown in FIG. 1 includes, for example, a processor 21, a memory 22, a wireless communication interface 23, and a wired communication interface 24. These components of the router 11 are connected to one another by, for example, a bus 29.

The processor 21 is processing circuitry that executes signal processing, and is, for example, a central processing unit (CPU) that controls the entire router 11. The processor 21 may be implemented by another digital circuit such as a field programmable gate array (FPGA) and a digital signal processor (DSP). The processor 21 may further be implemented by combining a plurality of digital circuits. The processor 21 is an example of the processing circuitry of the present disclosure.

The memory 22 includes a detection code (DC) storage area, which will be described later, and an interval detection code (IDC) storage area for temporarily storing an IDC, which will be described later, and includes, for example, a main memory and an auxiliary memory. The main memory is a random access memory (RAM). The main memory is used as a work area for the processor 21. In the DC storage area, up to N DCs and a DC generation time may be stored. When the number of the stored DCs exceeds N, a new DC may be registered by overwriting a specific past DC, or a new DC may be registered by overwriting the oldest DC.

The auxiliary memory is a non-volatile memory such as a magnetic disk, a flash memory, or the like. Various programs for operating the router 11 are stored in the auxiliary memory. The programs stored in the auxiliary memory are loaded into the main memory and executed by the processor 21.

The auxiliary memory may also include a portable memory removable from the router 11. The portable memory may include a universal serial bus (USB) flash drive and a memory card such as a secure digital (SD) memory card, an external hard disk drive, or the like.

The wireless communication interface 23 is a communication interface that executes the wireless communication. The wireless communication interface 23 is controlled by the processor 21. For example, the wireless communication interface 23 executes wireless LAN communication with the user terminals 12 and 13.

The wired communication interface 24 is a communication interface that executes wired communication. The wired communication interface 24 is controlled by the processor 21. For example, the wired communication interface 24 executes internet protocol (IP) communication with the network 2. Furthermore, the wired communication interface 24 may execute wired LAN communication with a communication device connected to the router 11 in a wired manner.

(Hardware Configuration Example of User Terminal 12)

Figure 3:
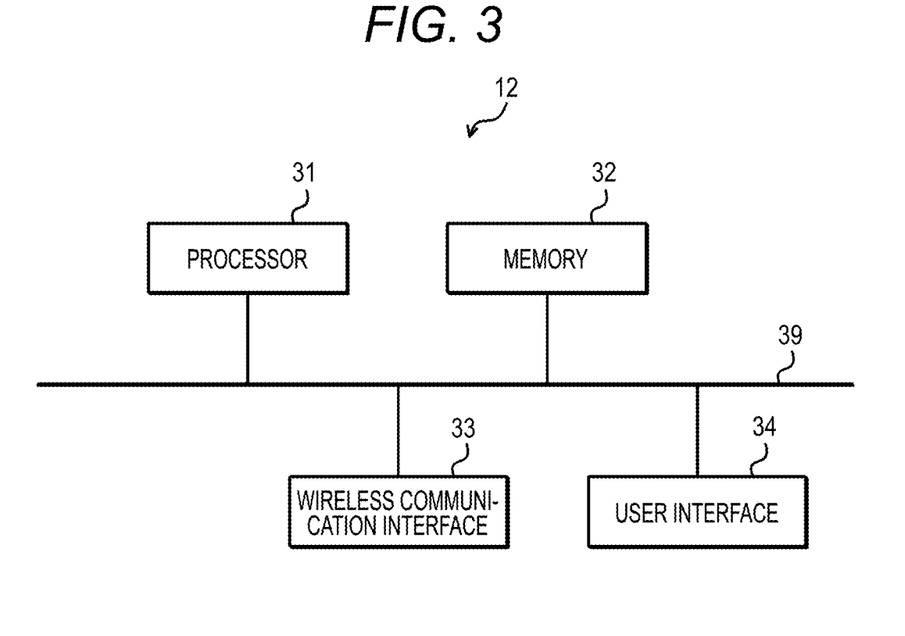
FIG. 3 is a diagram showing an example of a hardware configuration of a user terminal.

FIG. 3 is a diagram showing an example of a hardware configuration of the user terminal 12. The user terminal 12 shown in FIG. 3 includes, for example, a processor 31, a memory 32, a wireless communication interface 33, and a user interface 34. These components of the user terminal 12 are connected to one another by, for example, a bus 39.

The processor 31, the memory 32, and the wireless communication interface 33 have the same configuration as the processor 21, the memory 22, and the wireless communication interface 23 shown in FIG. 2, respectively.

The wireless communication interface 33 of the user terminal 12 executes the wireless LAN communication with the router 11. The wireless communication interface 33 of the user terminal 12 may also include a wireless communication interface that executes cellular communication and connects to the network 2 via a mobile communication network.

The user interface 34 includes, for example, an input device that receives operation input from a user and an output device that outputs information to the user. The input device may be realized by, for example, a key (for example, a keyboard) and a remote control. The output device may be realized by, for example, a display or a speaker. Both the input device and the output device may be realized by a touch panel or the like. The user interface 34 is controlled by the processor 31. The user terminal 12 may not include the user interface 34.

The user terminal 12 may include a wired communication interface that executes the wired LAN communication with the router 11.

The hardware configuration of the user terminal 12 has been described, and the same applies to a hardware configuration of the user terminal 13.

(IPv6 Line Connection Processing by Processor 21 of Router 11)

Figure 4:
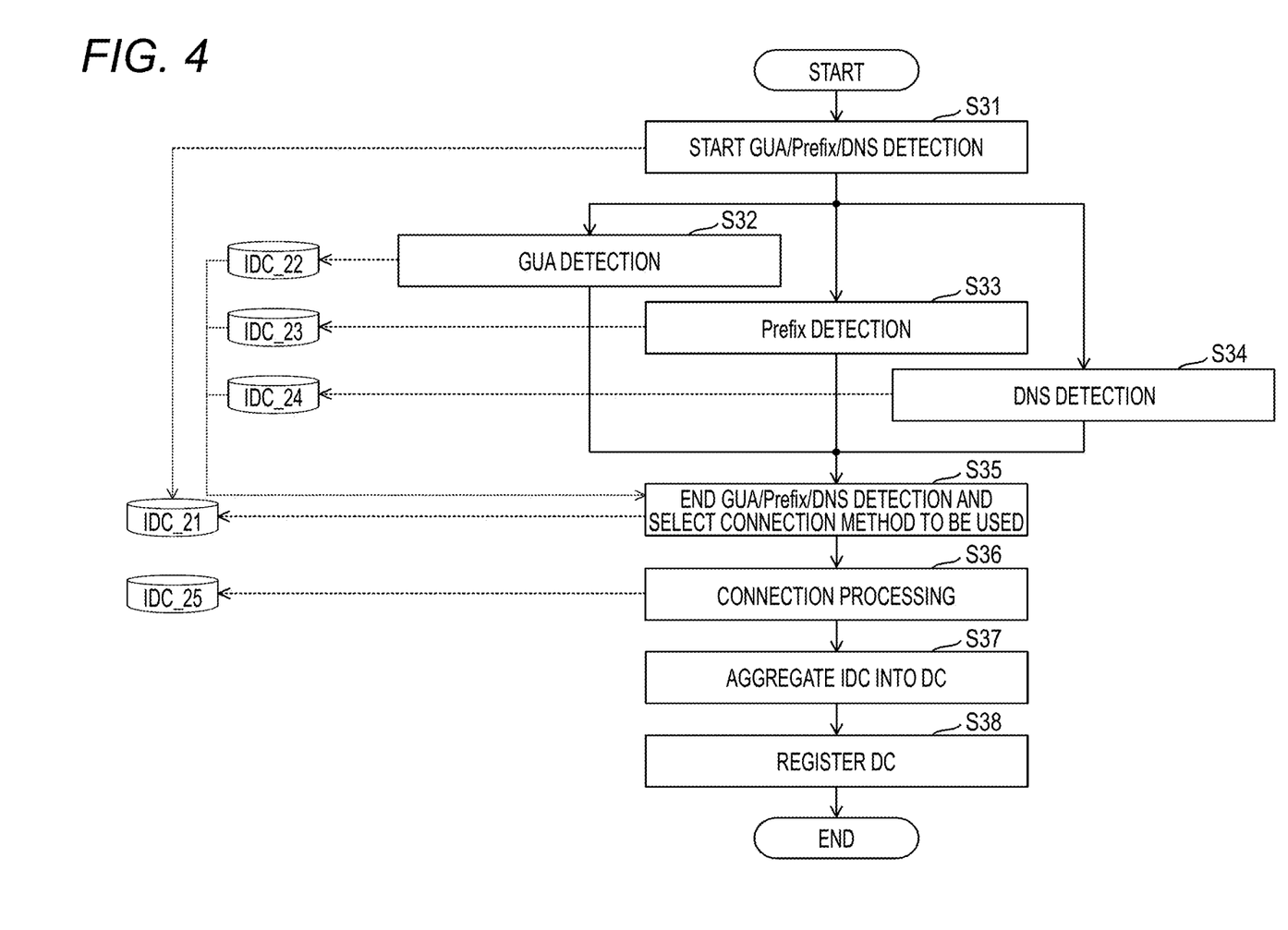
FIG. 4 is a flowchart showing an example of IPv6 line connection processing by a processor of the router.

FIG. 4 is a flowchart showing an example of IPv6 line connection processing by the processor 21 of the router 11, which is executed in parallel with IPv4 line connection processing by the processor 21 of the router 11 described with reference to FIG. 5. The processor 21 of the router 11 executes, for example, line connection processing shown in FIG. 4 for connection to the network 2 by IPv6.

First, the processor 21 executes GUA/Prefix/DNS detection for detecting whether a plurality of connection methods (GUA, Prefix, DNS) for connecting with IPv6 can be used (step S31). In step S31, for example, the processor 21 executes processing for starting the GUA detection, the Prefix detection, and the DNS detection in parallel. The processor 21 also generates IDC_21 indicating a result of the processing for starting the GUA/Prefix/DNS detection in step S31.

Next, the processor 21 executes steps S32 to S34 in parallel. In step S32, the processor 21 executes the GUA detection to detect whether a global unique address (GUA) can be used in the connection to the network 2 (step S32). The processor 21 also generates IDC_22 indicating a detection result of the GUA detection in step S32.

In step S33, the processor 21 executes Prefix detection to detect whether Prefix can be used in the connection to the network 2 (step S33). The processor 21 also generates IDC_23 indicating a detection result of the Prefix detection in step S33.

In step S34, the processor 21 executes the DNS detection to detect whether a domain name system (DNS) can be used in the connection to the network 2 (step S34). The processor 21 also generates IDC_24 indicating a detection result of the DNS detection in step S34.

The above processing is an example of the detection processing including detection of connection availability to the network 2 for each of a plurality of connection methods. The plurality of connection methods include, for example, GUA, Prefix, and DNS.

Next, the processor 21 ends the GUA/Prefix/DNS detection in steps S32 to S34 and selects a connection method to be used from among the connection methods detected as a useable connection method in the connection to the network 2 in steps S32 to S34 (step S35). The processor 21 also generates IDC_21 indicating a selection result of the connection method in step S35. At this time, the processor 21 aggregates the IDC_22, the IDC_23, and the IDC_24 generated in steps S32 to S34 into the IDC_21.

Next, the processor 21 executes the connection processing to the network 2 according to the selected connection method (step S36). The processor 21 also generates IDC_25 indicating a result of the connection processing to the network 2 in step S35.

Figure 7:
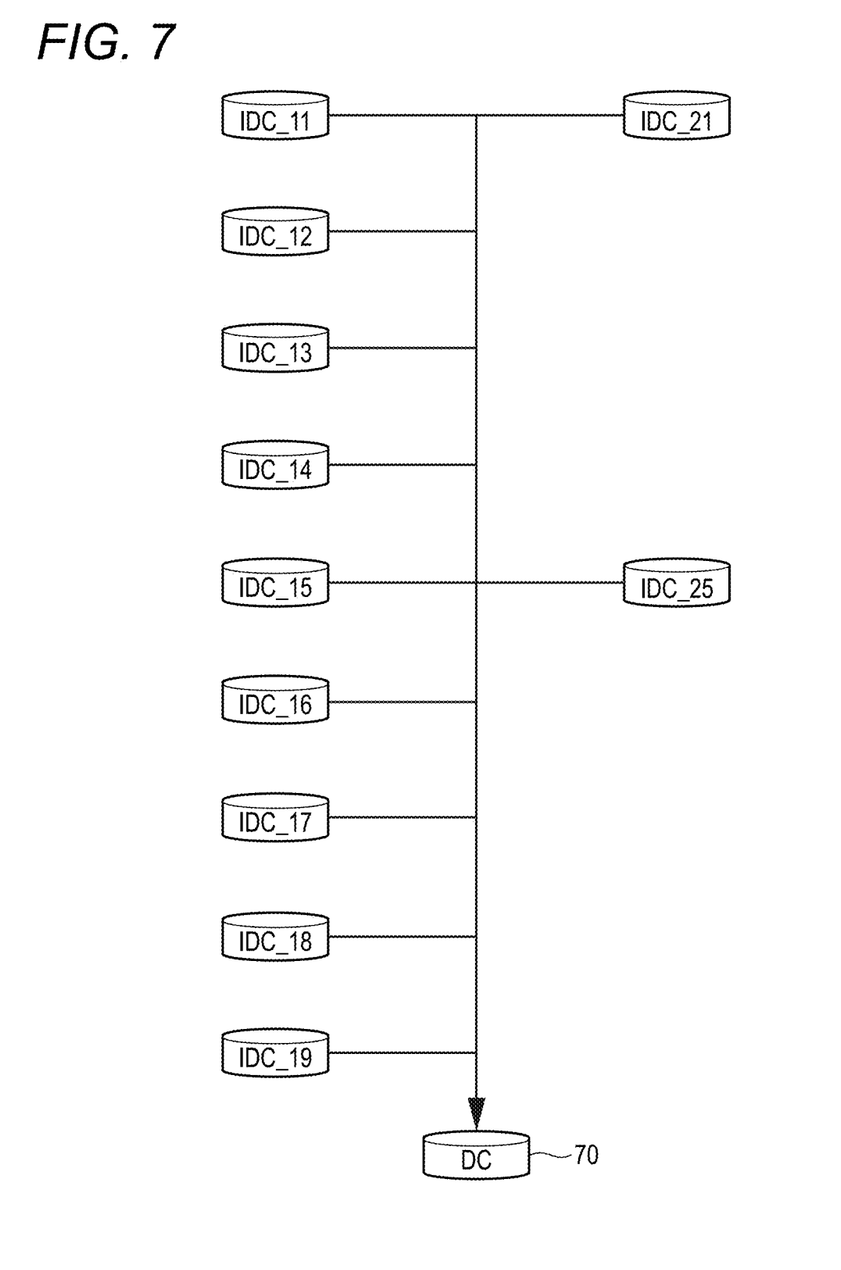
FIG. 7 is a diagram showing an example of aggregating a plurality of IDCs into a detection code (DC)

Next, the processor 21 generates a DC in which each IDC is collected (step S37) as shown in FIG. 7, and registers the DC generated in step S37 in the DC storage area (step S38).

(IPv4 Line Connection Processing by Processor 21 of Router 11)

Figure 5:
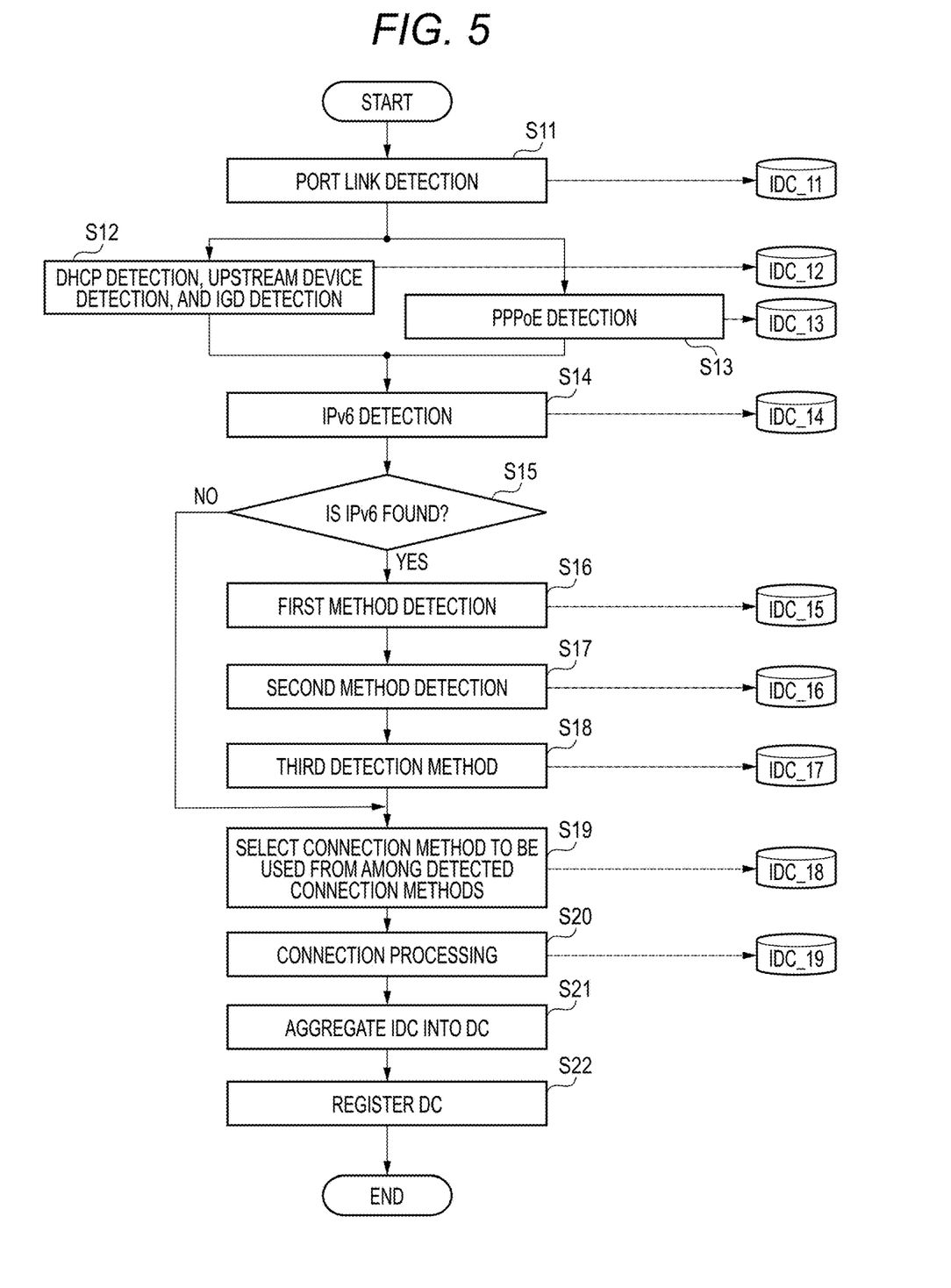
FIG. 5 is a flowchart showing an example of IPv4 line connection processing by the processor of the router.

FIG. 5 is a flowchart showing an example of IPv4 line connection processing by the processor 21 of the router 11. The processor 21 of the router 11 executes, for example, line connection processing shown in FIG. 5 for the connection to the network 2 by Internet Protocol version 4 (IPv4).

First, the processor 21 executes port link detection to detect whether there is a port link connectable to the network 2 (step S11). The processor 21 also generates IDC_11 indicating a detection result of the port link detection in step S11. The interval detection code (IDC) indicates a processing result of one interval in the line connection processing. The processing result includes, for example, whether the detection of various methods is started, whether the detection is completed, and a type of the detection result.

Next, the processor 21 executes steps S12 and S13 in parallel. In step S12, the processor 21 executes Dynamic Host Configuration Protocol (DHCP) detection, Internet Gateway Device (IGD) detection, and upstream device detection to detect whether DHCP can be used in the connection to the network 2 (step S12). The processor 21 also generates IDC_12 indicating a detection result of the DHCP detection, IGD detection, and the upstream device detection in step S12. The detection may be only DHCP detection or only IGD detection.

In step S13, the processor 21 executes Point-to-Point Protocol over Ethernet (PPPoE) detection to detect whether PPPoE can be used in the connection to the network 2 (step S13). Ethernet is a registered trademark. The processor 21 also generates IDC_13 indicating a detection result of the PPPoE detection in step S13.

Next, the processor 21 executes Internet Protocol version 6 (IPv6) detection to detect whether IPv6 can be used in the connection to the network 2 (step S14). For example, the processor 21 executes IPv6 detection in step S14 by referring to the result of the IPv6 line connection processing shown in FIG. 4, which is executed in parallel with the IPv4 line connection processing shown in FIG. 5. The processor 21 also generates IDC_14 indicating a detection result of the IPv6 detection in step S14.

Next, the processor 21 determines whether the connection to the network 2 with IPv6 is possible based on the result of step S14 (step S15). When the connection to the network 2 with IPv6 is not possible (step S15: No), the processor 21 proceeds to step S19. When the connection to the network 2 with IPv6 is possible (step S15: Yes), the processor 21 determines availability of a plurality of connection methods for IPv4 connection using an IPv6 network.

That is, first, the processor 21 executes first method detection to determine whether a first method can be used (step S16). The processor 21 also generates IDC_15 indicating a detection result of the first method detection in step S16.

Next, the processor 21 executes second method detection to determine whether second method can be used (step S17). The processor 21 also generates IDC_16 indicating a detection result of the second method detection in step S17.

Next, the processor 21 executes third method detection to determine whether a third method can be used (step S18). The processor 21 also generates IDC_17 indicating a detection result of the third method detection in step S18.

The first method, the second method, and the third method are all called IPv4 over IPv6 as connection methods for connecting with IPv4 using the IPv6 network. Such connection methods include, for example, Mapping of Addresses and Ports with Encapsulation (MAP-E), Dual-Stack Lite (DS-Lite), IP over IP (IPIP) Tunnel, Mapping of Address and Port Translation (MAP-T), and 464xlat.

The above processing is an example of the detection processing including detection of connection availability to the network 2 for each of a plurality of connection methods. The plurality of connection methods include, for example, DHCP, PPPoE, and IPv4 over IPv6.

Next, the processor 21 selects a connection method to be used from among the connection methods detected as the available connection method for the connection to the network 2 (step S19). For example, the processor 21 acquires priority information indicating a priority of each connection method and preferentially selects, based on the acquired priority information, the connection method to be used from among the usable connection methods as the connection method having a higher priority. The priority information is stored in, for example, the memory 22 of the processor 21. The processor 21 also generates IDC_18 indicating a selection result of the connection method in step S19. The priority information may be stored in a server, and the processor 21 may acquire the priority information from the server.

Next, the processor 21 executes the connection processing to the network 2 with the connection method selected in step S19 (step S20). The processor 21 also generates IDC_19 indicating a result of the connection processing to the network 2 in step S20.

Next, in step S21, the processor 21 collects the IDC_11 to the IDC_19 generated in IPv4 line connection processing and the IDC_21 and the IDC_25 generated in IPv6 line connection processing shown in FIG. 4 as shown in FIG. 7, and aggregates these IDCs into the detection code DC.

Next, in step S22, the processor 21 registers the DC generated in step S21 in the DC storage area.

When storing of the IDCs in the memory 22 in steps S12 and S13, which are executed in parallel, occurs at the same time, performance degradation of the line connection processing or the likes may be caused. Therefore, storage processing of the IDC in steps S12 and S13 may be executed cooperatively by another processing separated from the detection in steps S12 and S13.

(Transmission Processing of Detection Code by Processor 21 of Router 11)

Figure 6:
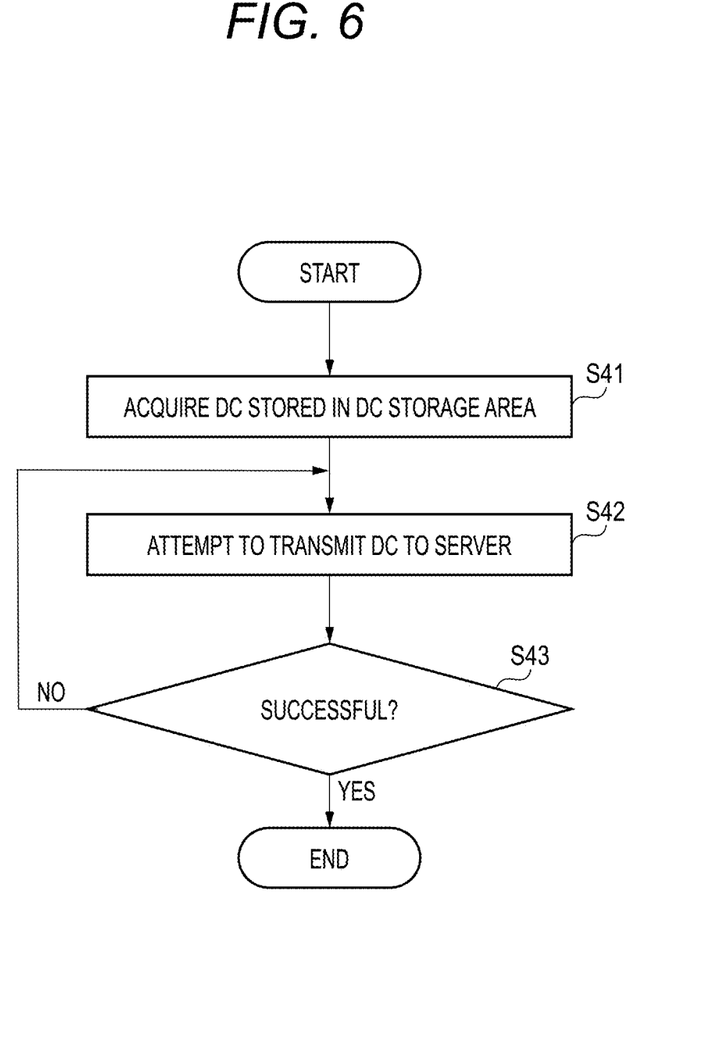
FIG. 6 is a flowchart showing an example of transmission processing of a detection code by the processor of the router.

FIG. 6 is a flowchart showing an example of transmission processing of the detection code by the processor 21 of the router 11. For example, after executing the connection processing of step S20 shown in FIG. 5 and the connection processing of step S36 shown in FIG. 4, the processor 21 executes transmission processing of the detection code (DC) shown in FIG. 6.

First, when an un-transmitted DC is stored in the DC storage area of the memory 22, the processor 21 acquires the DC (step S41).

Next, the processor 21 attempts to transmit the DC to the server 20 connected to the network 2 (step S42). For example, the processor 21 attempts to transmit N DCs registered in the DC storage area. The DC transmission is attempted by the wired communication interface 24 via the network 2 connected by, for example, the connection processing of step S20 shown in FIG. 5 or the connection processing of step S36 shown in FIG. 4.

Next, the processor 21 determines whether the DC transmission in step S44 is successful (step S43). When the DC transmission is not successful (step S43: No), the processor 21 returns to step S42 and attempts the DC transmission again.

In step S43, when the DC transmission is successful (step S43: Yes), the processor 21 ends the series of processing.

According to the transmission processing shown in FIG. 6, the processor 21 may collectively transmit up to N DCs generated until that time point to the server 20. While the case where the transmission processing shown in FIG. 6 is executed in response to the connection processing of step S20 shown in FIG. 5 or the connection processing of step S36 shown in FIG. 4 has been described, the processor 21 may execute the transmission processing shown in FIG. 6 periodically or in response to an instruction from the user.

For example, it is assumed that, after the connection of the router 11 to the network 2 by the line connection processing shown in FIGS. 4 and 5 fails, the user selects a connection method by manual setting and the connection of the router 11 to the network 2 is successful. In this case, up to N DCs which include a DC when the connection fails and which are stored in the DC storage area are transmitted to the server 20 via the network 2. As a result, in the server 20, it is possible to easily execute an investigation for improvement or the like of an algorithm of the line connection processing shown in FIGS. 4 and 5. For example, by collecting the same DCs from a plurality of routers including the router 11, when connection for each internet service provider (ISP) fails, it becomes possible to execute analysis such as a tendency when the connection is restored.

Further, in the DCs generated in responding to the line connection processing shown in FIG. 5, in a case where, due to an influence of one detection of the steps S12 and S13 executed in parallel, the other detection of the steps S12 and S13 is interrupted, success or failure such as failure should be set in the IDC_13 in a case where the other interrupted detection is handled. In a case where the other interrupted detection is not be handled, the IDC_12 should be set. Therefore, based on the IDC_13, it is possible to analyze the situation when the connection by the line connection processing fails.

Furthermore, in the DCs generated in responding to the line connection processing shown in FIG. 5, if the IDC_15 to the IDC_17 are pieces of information indicating "unexecuted" or the like, it may be inferred that steps S16 to S18 are skipped.

(Aggregation of Plurality of IDCs into Detection Code)

FIG. 7 is a diagram showing an example of aggregating a plurality of IDCs into a DC (detection code). The IDC_11 to the IDC_19 are IDCs generated in the IPv4 line connection processing shown in FIG. 5. The IDC_21 and the IDC_25 are IDCs generated in the IPv6 line connection processing shown in FIG. 4.

Among the IDC_11 to the IDC_19, the IDC_21, and the IDC_25, IDCs related to connection method detection (for example, the IDC_12 to the IDC_17 and the IDC_22 to the IDC_24) include information on the connection availability to the network 2 with that connection method and an error type (such as at which stage a failure occurs) in a case where the connection to network 2 is not available with that connection method.

The processor 21 generates a DC 70 storing each value of the IDC_11 to the IDC_19, the IDC_21, and the IDC_25 in a predetermined format. As a result, the DC (detection code) 70 is generated in which the IDC_11 to the IDC_19, the IDC_21, and the IDC_25 are aggregated. The predetermined format may be, for example, a format in which a predetermined order is determined, or may be a set of result information obtained by assigning a specific code to each connection method. Specifically, the predetermined format includes a type length value (TLV) format and a key value format.

(Data Structure of Detection Code)

Figure 8:
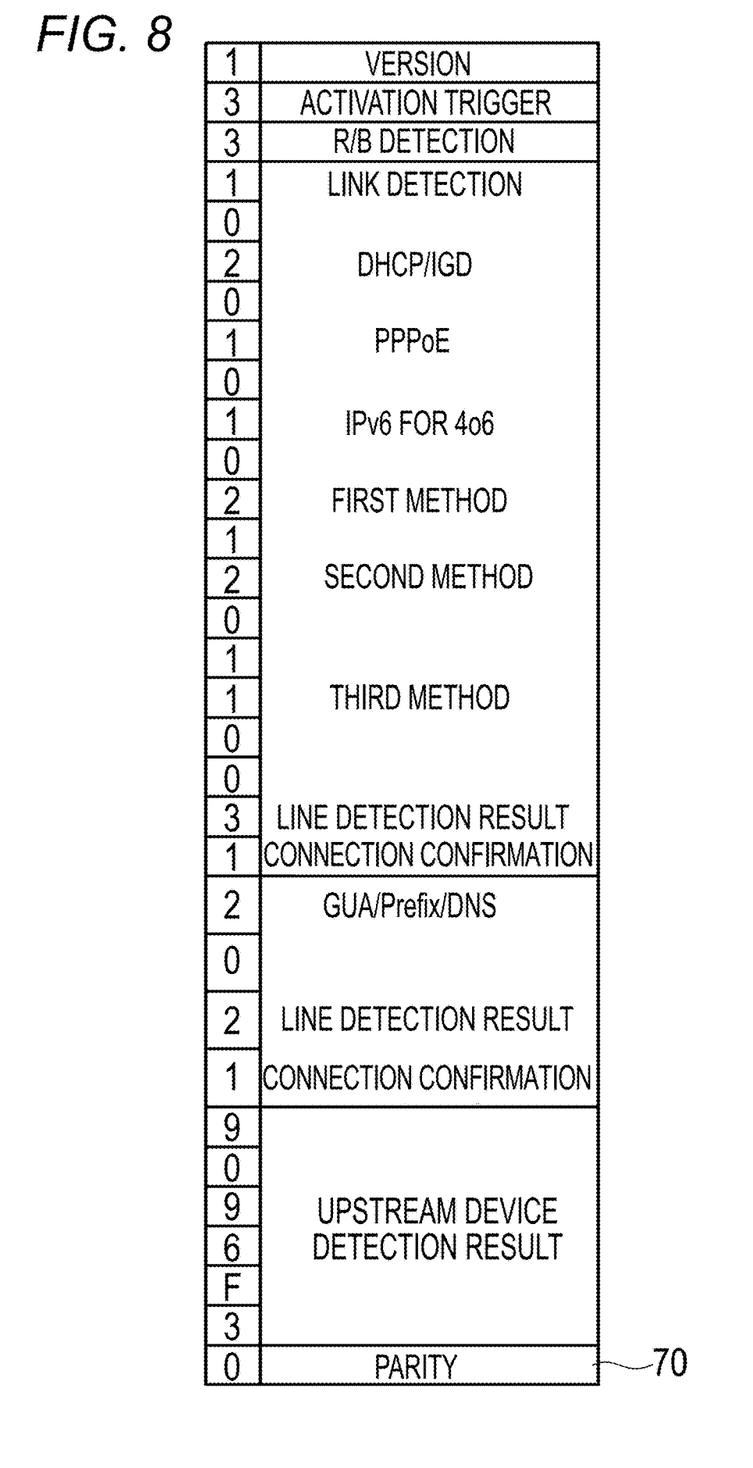
FIG. 8 is a diagram showing an example of a data structure of the DC.

FIG. 8 is a diagram showing an example of a data structure of the DC (detection code) 70. As shown in FIG. 8, the DC 70 is, for example, a 32-digit hexadecimal code ("13310201010212011003120219096F30").

In the example shown in FIG. 8, the fourth to fifth digits (link detection) of the DC 70 are values of the IDC_11 indicating the result of the port link detection in step S11 shown in FIG. 5.

The sixth to seventh digits (DHCP) of the DC 70 are values of the IDC_12 indicating the results of the DHCP detection and the IGD detection in step S12 shown in FIG. 5.

The eighth to ninth digits (PPPoE) of the DC 70 are values of the IDC_13 indicating the result of the PPPoE detection in step S13 shown in FIG. 5.

The tenth to eleventh digits (IPv6 for 4o6) of the DC 70 are values of the IDC_14 indicating the result of IPv6 detection in step S14 shown in FIG. 5.

The twelfth to thirteenth digits (first method) of the DC 70 are values of the IDC_15 indicating the result of the first method detection in step S16 shown in FIG. 5.

The fourteenth to sixteenth digits (second method) of the DC 70 are values of the IDC_16 indicating the result of the second method detection in step S17 shown in FIG. 5.

The seventeenth to nineteenth digits (third method) of the DC 70 are values of the IDC_17 indicating the result of the third method detection in step S18 shown in FIG. 5.

The twentieth digit (selection result of the connection method) of DC70 is a value of the IDC_18 of a connection processing result indicating the selection result of the connection method in step S19 shown in FIG. 5.

The 21st digit (connection confirmation) of the DC 70 is a value of the IDC_19 indicating the result of the connection processing in step S20 shown in FIG. 5.

The 22nd to 23rd digits (GUA/Prefix/DNS) of the DC 70 are values of the IDC_21 (including a result of merging the IDC_22 to the IDC_24) indicating the result of detection by steps S31 to S34 shown in FIG. 4.

The 24th to 25th digits (the selection result of the connection method and the connection processing result) of the DC 70 are values of the IDC_25 indicating the results of the selection of the connection method and the connection processing in step S36 shown in FIG. 4.

The DC 70 is described as an example of the detection code, and the detection code is not limited to the DC 70. For example, for the DC 70, an arrangement of each value and the number of assigned digits may be arbitrarily designed. The detection code may be a code obtained by encoding a code such as the DC 70. This encoding method is a reversible transform method capable of restoring the DC 70 from the encoded code.

As an example, when "13310201010212011003120219096F30", which is the DC 70 shown in FIG. 8, is encoded with, for example, an encoding method of a unique reversible transformation method, a code "CMYQE-AIBAI-JACEA-DCIBB-SCLPGA" may be obtained, which may be used as the detection code. In this case, in step S43 shown in FIG. 6, the processor 21 registers, in the DC storage area, a code obtained by encoding the DC instead of the DC.

In this way, the processor 21 executes the detection processing. The detection processing is processing (for example, steps S12 to S18 shown in FIG. 5 and steps S32 to S34 shown in FIG. 4) including determination of the connection availability to the network 2 with each of the plurality of connection methods. The processor 21 executes the connection processing to the network 2 with the connection method selected based on the result of the detection processing. Each time executing the detection processing, the processor 21 generates a detection code (DC 70) indicating the detection result for the plurality of connection methods obtained by the detection processing. As a result, it is possible to provide the detection code indicating the detection result of the plurality of connection methods to an entity (for example, the server 20) that collects the detection code through the router 11 after connection to the network 2, or by communication using a telephone or the like.

In the detection code, the detection result for the plurality of connection methods is shown in a predetermined format. Therefore, the entity that collects the detection code can easily analyze how the detection processing including the detection of the connection availability to the network 2 for each of the plurality of connection methods is executed.

(Display of Detection Code)

Figure 9:
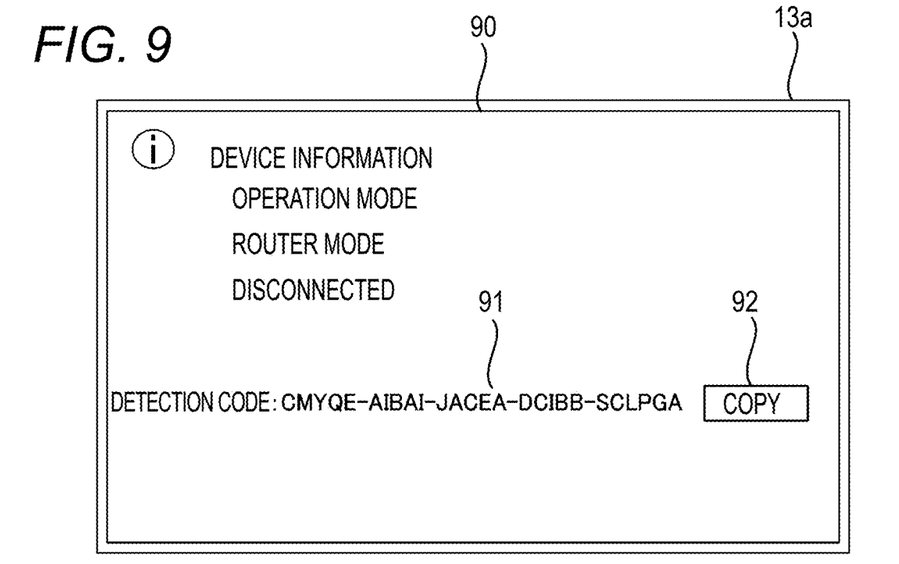
FIG. 9 is a diagram showing an example of display of the DC.

FIG. 9 is a diagram showing an example of display of the DC 70 (detection code). The processor 21 of the router 11 may execute control to cause the communication device connected to the router 11 to reproduce the DC 70, which is the detection code, or information with which the DC 70 can be restored. For example, it is assumed that the user terminal 13 (notebook personal computer) shown in FIG. 1 is connected to the router 11 via a wired LAN or the wireless LAN.

In this case, in response to a request from the user terminal 13, the processor 21 of the router 11 transmits a code 91 ("CMYQE-AIBAI-JACEA-DCIBB-SCLPGA"), which is information with which the DC 70 can be restored, to the user terminal 13 together with device information (operation mode and the like) of the processor 21. The user terminal 13 displays an image 90 indicating information received from the router 11 by a display 13a of the user terminal 13.

Accordingly, for example, when a communication failure in which the router 11 cannot be connected to the network 2 occurs, the user of the router 11 may easily transmit the code 91 to the inquiry destination such as a manufacturer when making an inquiry to the inquiry destination. For example, in the case in which an inquiry is made using a telephone, the code 91 shorter than the DC 70 by compression may be easily transmitted orally. Also, in the case when an inquiry is made by e-mail, chat, inquiry form, or the like by the user terminals 12 and 13 that can be connected to the network 2 in a path different from that of the router 11, the code 91 shorter than the DC 70 by compression may be easily input and transmitted.

Therefore, even in a situation where the router 11 cannot transmit the DC to the server via the network 2, it is possible to easily provide the DC 70 to the inquiry destination. Therefore, an appropriate response to the inquiry may be made at the inquiry destination, or an appropriate investigation for improvement of the algorithm of the line connection processing shown in FIGS. 4 and 5 may be executed. The network 2 described above refers to, for example, a WAN, and is a network that can be connected after the connection method is detected.

A copy button 92 may also be included. When the user of the user terminal 13 performs instruction operation on the copy button 92, the code 91 is copied to a clipboard of an operating system (OS) of the user terminal 13. As a result, the user may easily input the code 91 in an e-mail, a chat, an inquiry form, or the like by a paste operation.

While the control to cause the user terminal 13 to display the code 91 has been described, the processor 21 may execute control to cause a speaker of the user terminal 13 to output the code 91 by voice, for example.

In a case where a main body of the router is provided with either or both of a speaker and a liquid crystal monitor, the code 91 may be displayed and output from the speaker or the liquid crystal monitor of the router.

Figure 10:
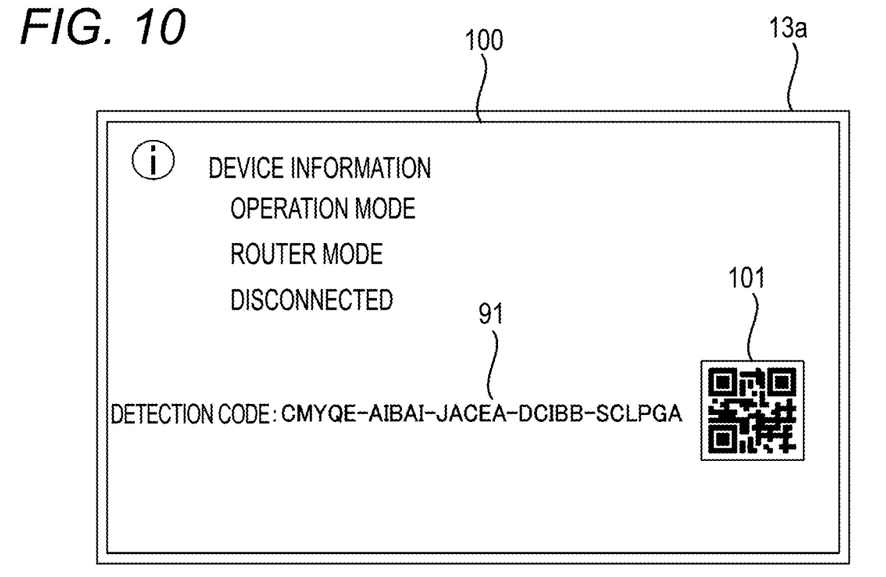
FIG. 10 is a diagram showing a modification example of the display of the DC.

FIG. 10 is a diagram showing a modification of the display of the DC 70 (detection code). In response to the request from the user terminal 13, the processor 21 of the router 11 may convert the first information including the code 91 ("CMYQE-AIBAI-JACEA-DCIBB-SCLPGA") into an optically readable two-dimensional code 101 in a format transmittable to the server 20 (specific transmission destination), and may transmit, in addition to the device information (operation mode and the like) of the processor 21, the code 91 of the processor 21, and the two-dimensional code 101. The first information is, for example, a uniform resource identifier (URI) including the code 91 as a query following an address of the server 20. The code 91 may include the URI or may not include the URI. The code 91 may also be electronically readable.

In this case, the user terminal 13 displays an image 100 including the device information, the code 91, and the two-dimensional code 101 on the display 13a. On the other hand, for example, the user captures the two-dimensional code 101 using the user terminal 12 (smartphone). The user terminal 12 acquires the above URI (first information) from imaging data of the two-dimensional code 101 and accesses the acquired URI via, for example, a mobile communication network.

In addition, the user may capture the code 91 displayed on the user terminal 13 by a screenshot or the like using the user terminal 12, and send the code 91 to a specific transmission destination.

Accordingly, even in a situation where the router 11 cannot be connected to the network 2, the user may easily transmit the code 91 to the server 20 by capturing the two-dimensional code 101 using the user terminal 12 (smartphone) connectable to the mobile communication network.

While the example has been described in which the router 11 transmits the two-dimensional code 101 from which the first information (URI) is optically readable to the user terminal 13 with reference to the example shown in FIG. 10, the router 11 may transmit the first information to the user terminal 13. In this case, the user terminal 13 converts the first information received from the router 11 into the two-dimensional code 101 and displays the two-dimensional code 101.

While the example in which the code 91 is a code in which the DC 70 is encoded has been described with reference to the examples shown in FIGS. 9 and 10, the code 91 may be a DC 70 that is not encoded.

(Modification 1)

While the router 11 has been described as the network device, the network device is not limited to the router 11 and may be a network device that relays communication between the communication device and the network 2.

(Modification 2)

While the transmission processing of collectively transmitting the most recent N DCs is described in FIG. 6, the processor 21 may store the DC generated for each line connection processing shown in FIGS. 4 and 5 up to N for each state after the line connection processing. The processor 21 may collectively transmit the most recent N DCs for each state after the line connection processing. As a result, even in a case where the same error occurs N times or more in the line connection processing, for example, it is possible to prevent a situation in which logs related to the error of the previous line connection processing cannot be collected. As a state after the line connection processing (corresponding to the determined state), for example, any states such as "failure immediately before the initial connection succeeds after the initial startup", "the initial connection succeeds after the initial startup" and the likes can be set.

The determined state after the line connection processing may be identified by assigning a predetermined code to the DC. Alternatively, a table in which each determined state can be identified may be provided and the detection code DC may be stored therein for each determined state. These are stored in the DC storage area.

(Modification 3)

A configuration may be adopted in which a communication device that is remotely accessible to the router 11 has an initiative to acquire (PULL) the detection code (DC) from the router 11 in response to a request from the communication device. As a result, for example, a supporter different from the user may remotely access the router 11 of the user and confirm the detection code.

(Modification 4)

The router 11 may have the initiative to transmit (PUSH) the detection code to a specific terminal on a LAN side. Thereby, for example, a logging server on the LAN side or a dedicated management application (for example, an application of the user terminal 12 or the user terminal 13) may collect the result code.

(Program)

Programs stored in a read only memory (ROM) of the memory 22 of the router 11 and programs stored in a ROM of the memory 32 of the user terminal 12 are stored in a non-transitory storage medium in which these programs can be read by a computer. The "computer-readable storage medium" is, for example, an optical medium such as a compact disc-ROM (CD-ROM) or a magnetic storage medium such as a USB memory or a memory card. Such a program can also be provided by downloading via a network.

As described above, the following matters are disclosed in the present specification.

(1) A network device that is connectable to a network, the network device including:
  processing circuitry configured to
    execute detection processing including detection of connection availability for a plurality of different types of connections to the network, and
    generate a detection code indicating a detection result of the plurality of different types of connections to the network in responding to the detection processing.

(2) The network device according to (1), in which the detection processing includes detection of connection availability in parallel for each of the plurality of different types of connections to the network.

(3) The network device according to (2), in which the detection result includes an error type related to the connection to the network.

(4) The network device according to (1), in which the detection code includes a portion in which the detection result of the plurality of different types of connections to the network is stored according to a predetermined format.

(5) The network device according to (1), in which the processing circuitry is configured to transmit the detection code or information with which the detection code is restorable to a specific transmission destination via the network that is connectable by detecting a type of connection to the network from among the different types of connections to the network, in a state of being connected to the network.

(6) The network device according to (5), in which the processing circuitry is configured to collect a predetermined number of the detection code or of pieces of the information with which the detection code is restorable and to transmit the detection code or the information to the specific transmission destination via the network that is connectable by detecting the type of connection to the network.

(7) The network device according to (1), in which the processing circuitry is configured to notify a communication device connected to the network device of the detection code or information with which the detection code is restorable, not via the network that is connectable by detecting a type of connection to the network from among the different types of connections to the network.

(8) The network device according to (1), in which the processing circuitry is configured to notify a communication device capable of remotely accessing the network of the detection code or information with which the detection code is restorable.

(9) The network device according to (1), in which the detection code or information with which the detection code is restorable is acquired by a communication device capable of remotely accessing the network in response to a request from the communication device.

(10) The network device according to (1), in which the processing circuitry is configured to notify a communication device connected to a network different from the network to which the network device is connectable of the detection code or information with which the detection code is restorable.

(11) The network device according to (1), further including:
  a memory for storing the detection code.

(12) The network device according to (11), in which the detection code is stored in the memory in association with a determined state.

(13) The network device according to (12), in which the processing circuitry is configured to collect a predetermined number of the detection code or of pieces of information with which the detection code is restorable for each determined state and to transmit the detection code or the information to a specific transmission destination via the network that is connectable by detecting a type of connection to the network from among the different types of connections to the network.

(14) The network device according to (1), in which
the processing circuitry is configured to notify a communication device connected to the network device of the detection code or information with which the detection code is restorable, not via the network that is connectable by detecting a type of connection to the network from among the different types of connections to the network.

(15) The network device according to (1), in which
the processing circuitry is configured to select a type of connection to the network from among the different types of connections to the network to be used according to a predetermined priority based on the detection result of the plurality of different types of connections to the network.

(16) A control method for a network device connectable to a network, including:
executing, by processing circuitry of the network device, detection processing including detection of connection availability for a plurality of different types of connections to the network; and
generating, by the processing circuitry of the network device, a detection code indicating a detection result for the plurality of different types of connections to the network in responding to the detection processing.

(17) The control method of according to (16), in which
the detection processing includes detection of connection availability to the network.

(18) The control method of according to (17), in which
the detection result includes an error type related to the connection to the network.

(19) The control method according to (16), in which the detection code includes a
portion in which the detection result of the plurality of different types of connections to the network is stored according to a predetermined format.

(20) A non-transitory computer-readable storage medium storing a control program to cause a processor of a network device connectable to a network to execute a process, the process including:
executing detection processing including detection of connection availability for a plurality of different types of connections to the network; and
generating a detection code indicating a detection result for the plurality of different types of connections to the network in responding to the detection processing.

What is claimed is:

1. A network device that is connectable to a network, the network device comprising:
processing circuitry configured to
execute detection processing including detection of connection availability for a plurality of different types of connections to the network,
generate a detection code indicating a detection result of the plurality of different types of connections to the network in responding to the detection processing,
wherein the detection code includes a plurality of portions in which the detection result of each of the plurality of different types of connections to the network is stored in one of the plurality of portions according to a predetermined format,
wherein the detection code stores each value of an interval detection code (IDC) including IDCs related to connection method detection which includes information on the connection availability to the network with that connection method and an error type in a case where the connection the network is not available with that connection method, and
transmit the detection code or information with which the detection code is restorable to a specific transmission destination via the network that is connectable by detecting a type of connection to the network from among the different types of connections to the network, in a state of being connected to the network.

2. The network device according to claim 1, wherein
the detection processing includes detection of connection availability in parallel for each of the plurality of different types of connections to the network.

3. The network device according to claim 2, wherein
the detection result includes an error type related to the connection to the network.

4. The network device according to claim 1, further comprising:
a memory for storing the detection code.

5. The network device according to claim 4, wherein
the detection code is stored in the memory in association with a determined state.

6. The network device according to claim 5, wherein
the processing circuitry is configured to collect a predetermined number of the detection code or of pieces of information with which the detection code is restorable for each determined state and to transmit the detection code or the information to a specific transmission destination via the network that is connectable by detecting a type of connection to the network from among the different types of connections to the network.

7. The network device according to claim 1, wherein
the processing circuitry is configured to collect a predetermined number of the detection code or of pieces of the information with which the detection code is restorable and to transmit the detection code or the information to the specific transmission destination via the network that is connectable by detecting the type of connection to the network.

8. The network device according to claim 1, wherein
the processing circuitry is configured to notify a communication device connected to the network device of the detection code or information with which the detection code is restorable, not via the network that is connectable by detecting a type of connection to the network from among the different types of connections to the network.

9. The network device according to claim 1, wherein
the processing circuitry is configured to notify a communication device capable of remotely accessing the network of the detection code or information with which the detection code is restorable.

10. The network device according to claim 1, wherein
the detection code or information with which the detection code is restorable is acquired by a communication device capable of remotely accessing the network in response to a request from the communication device.

11. The network device according to claim 1, wherein
the processing circuitry is configured to notify a communication device connected to a network different from the network to which the network device is connectable of the detection code or information with which the detection code is restorable.

12. The network device according to claim 1, wherein
the processing circuitry is configured to notify a communication device connected to the network device of the detection code or information with which the detection code is restorable, not via the network that is connectable by detecting a type of connection to the network from among the different types of connections to the network.

13. The network device according to claim 1, wherein
the processing circuitry is configured to select a type of connection to the network from among the different types of connections to the network to be used according to a predetermined priority based on the detection result of the plurality of different types of connections to the network.

14. The network device according to claim 1, wherein the processing circuitry is configured to
store the detection code generated for each line connection processing up to N for each state after the line connection processing, and
collectively transmit the most recent N detection codes for each state after the line connection processing.

15. A control method for a network device connectable to a network, comprising:
executing, by processing circuitry of the network device, detection processing including detection of connection availability for a plurality of different types of connections to the network;
generating, by the processing circuitry of the network device, a detection code indicating a detection result for the plurality of different types of connections to the network in responding to the detection processing,
wherein the detection code includes a plurality of portions in which the detection result of each of the plurality of different types of connections to the network is stored in one of the plurality of portions according to a predetermined format,
wherein the detection code stores each value of an interval detection code (IDC) including IDCs related to connection method detection which includes information on the connection availability to the network with that connection method and an error type in a case where the connection the network is not available with that connection method; and
transmitting, by the processing circuitry of the network device, the detection code or information with which the detection code is restorable to a specific transmission destination via the network that is connectable by detecting a type of connection to the network from among the different types of connections to the network, in a state of being connected to the network.

16. The control method according to claim 15, wherein
the detection processing includes detection of connection availability to the network.

17. A non-transitory computer-readable storage medium storing a control program to cause a processor of a network device connectable to a network to execute a process, the process comprising:
executing detection processing including detection of connection availability for a plurality of different types of connections to the network;
generating a detection code indicating a detection result for the plurality of different types of connections to the network in responding to the detection processing,
wherein the detection code includes a plurality of portions in which the detection result of each of the plurality of different types of connections to the network is stored in one of the plurality of portions according to a predetermined format,
wherein the detection code stores each value of an interval detection code (IDC) including IDCs related to connection method detection which includes information on the connection availability to the network with that connection method and an error type in a case where the connection the network is not available with that connection method; and
transmitting the detection code or information with which the detection code is restorable to a specific transmission destination via the network that is connectable by detecting a type of connection to the network from among the different types of connections to the network, in a state of being connected to the network.

\* \* \* \* \*